(12) United States Patent
Stoneberg et al.

(10) Patent No.: US 12,221,711 B2
(45) Date of Patent: Feb. 11, 2025

(54) METHOD FOR ACCELERATED PRODUCTION OF ELECTROFORM TOOLING INSERTS

(71) Applicant: Sharklet Technologies, Inc., Aurora, CO (US)

(72) Inventors: Ryan Eugene Stoneberg, Aurora, CO (US); Kevin Lee Ballard, Aurora, CO (US)

(73) Assignee: SHARKLET TECHNOLOGIES, INC., Aurora, CO (US)

( * ) Notice: Subject to any disclaimer, the term of this patent is extended or adjusted under 35 U.S.C. 154(b) by 456 days.

(21) Appl. No.: 17/618,631

(22) PCT Filed: Jun. 15, 2020

(86) PCT No.: PCT/US2020/037719
§ 371 (c)(1),
(2) Date: Dec. 13, 2021

(87) PCT Pub. No.: WO2020/252448
PCT Pub. Date: Dec. 17, 2020

(65) Prior Publication Data
US 2022/0235480 A1 Jul. 28, 2022

Related U.S. Application Data

(60) Provisional application No. 62/860,940, filed on Jun. 13, 2019.

(51) Int. Cl.
*C25D 1/10* (2006.01)
*C25D 5/00* (2006.01)
(Continued)

(52) U.S. Cl.
CPC ............... *C25D 1/10* (2013.01); *C25D 5/605* (2020.08); *B33Y 10/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS 3,723,584 A 3/1973 Nussbaum
5,260,014 A 11/1993 Holton et al.
(Continued)

OTHER PUBLICATIONS

English translation WO 2012007526, Moeller et al. (Year: 2012).*
(Continued)

*Primary Examiner* — Stefanie S Wittenberg
(74) *Attorney, Agent, or Firm* — CANTOR COLBURN LLP

(57) ABSTRACT

Disclosed herein is a method comprising growing a shim by disposing a mandrel having an optional textured surface in an electrolytic bath, where the shim contains a negative image of the optional textured surface formed by electrolytic deposition of a metal; affixing the shim working-side down on a reference plane using a fixture; optically scanning the shim to reverse engineer a geometry of a non-working surface, where reverse engineering a geometry of the non-working surface includes developing a profile of the non-working surface and the thickness of the shim; and adding a material to the non-working surface of the shim via additive manufacturing to form a tool insert.

9 Claims, 1 Drawing Sheet

(51) Int. Cl.
*B33Y 10/00* (2015.01)
*B33Y 70/00* (2020.01)
*B33Y 80/00* (2015.01)

(56) References Cited

U.S. PATENT DOCUMENTS

| | | |
|---|---|---|
| 6,409,902 B1 | 6/2002 | Yang et al. |
| 2004/0134880 A1 | 7/2004 | Afromowitz |
| 2015/0108000 A1* | 4/2015 | Lee .................. B29C 33/3857 205/70 |
| 2018/0078423 A1 | 3/2018 | Magin et al. |

OTHER PUBLICATIONS

English translation WO 2019099029, Van Brocklin et al. (Year: 2019).*
International Search Report for International Application No. PCT/US2020/037719; International Filing date Jun. 15, 2020; Report Mail Date Sep. 4, 2020; 4 pages.
Written Opinion for International Application No. PCT/US2020/037719; International Filing date Jun. 15, 2020; Report Mail Date Sep. 4, 2020; 4 pages.

* cited by examiner

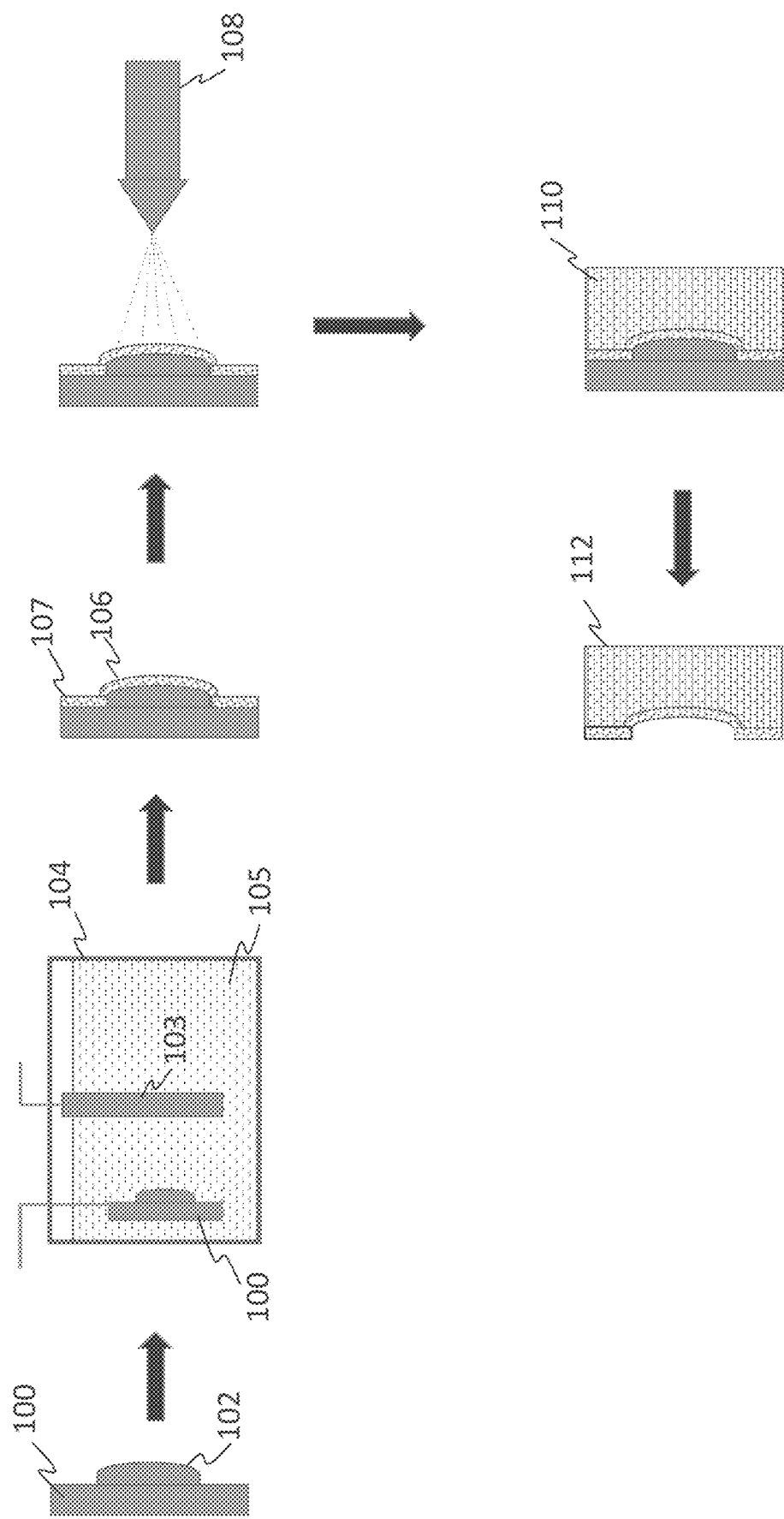

METHOD FOR ACCELERATED PRODUCTION OF ELECTROFORM TOOLING INSERTS

CROSS REFERENCE TO RELATED APPLICATIONS

This application is a National Stage application of PCT/US2020/037719, filed Jun. 15, 2020, which claims the benefit of U.S. Provisional Application No. 62/860,940, filed Jun. 13, 2019, both of which are incorporated by reference in their entirety herein.

BACKGROUND

This disclosure relates to a method for accelerated production of electroform tooling inserts.

Surfaces with convoluted textures and shapes that have a convoluted topography are often used as tooling inserts. Electroforming is often an efficient way for manufacturing tools and tooling inserts that have complex external shapes and internal geometries. However, tools and tooling inserts manufactured by such process often have non-uniform thicknesses because of variable deposition rates during electroforming. It is therefore desirable to find an expeditious method to correct for such problems.

SUMMARY

Disclosed herein is a method comprising growing a shim by disposing a mandrel having an optional textured surface in an electrolytic bath, where the shim contains a negative image of the optional textured surface formed by electrolytic deposition of a metal; affixing the shim working-side down on a reference plane using a fixture; optically scanning the shim to reverse engineer a geometry of a non-working surface, where reverse engineering a geometry of the non-working surface includes developing a profile of the non-working surface and the thickness of the shim; and adding a material to the non-working surface of the shim via additive manufacturing to form a tool insert.

BRIEF DESCRIPTION OF THE FIGURES

The FIGURE depicts a schematic of an exemplary process for producing a shim that can be used to mass produce replicas of a surface.

DETAILED DESCRIPTION

The process described below provides a route to substantially decrease the timing and costs associated with the production of electroformed tools for use in high fidelity injection molding, resin transfer molding and/or embossing applications. This process may be used to create tooling for both thermoplastic and thermoset polymeric production operations. The process comprises growing a thin electroform, affixing it working-side down to a reference plane, optionally laser-scanning the electroformed surface to reverse engineer consequent geometry of non-working surface, machining the surface if needed to resolve problems with additive manufacturing, and then 3D printing a metal on the back of the electroform to increase its overall thickness for use in process tooling applications. Other additive manufacturing processes (or manufacturing process that do not include additive manufacturing) such as cold spray additive manufacturing, cladding, or flame spraying may be conducted in order to increase overall thickness.

Through the addition of 3D metal printing to the process, conformal, capillary, or traditional cooling channels may be printed directly into the body of the insert for increased mold performance. Fasteners may also be 3D printed on to the back side of the insert for affixation to other substrates.

The use of 3D additive printing in addition to electrolytic manufacturing of the metal shim can reduce the timing used to produce an electroformed nickel insert by up to as much as 3 days when compared with processes that do not use additive manufacturing. Modern 3D printing technologies can deposit nickel alloy at rates of up to 0.5 kg/hour (kilograms per hour). This means that an insert of size 6 inches×6 inches may be printed up to 0.5 inches in thickness in about 5 hours.

The method is detailed herein with reference to the FIGURE where a mandrel 100 having an optional textured surface 102 is placed in an electrolytic bath 104 to produce a metal shim 106 (also referred to herein as an electroform) on the surface 102. Additive manufacturing may then be used to reinforce the metal electroform 106 to produce a reinforced metal electroform 108. The reinforced metal electroform 108 may then be used to mold other components in a mass production process.

The mandrel 100 is a template that may have one or more textured surfaces 102. The textured surface 102 is optional. The textured surface may include regular or irregular features that need to be reproduced onto a large number of other surfaces in a mass manufacturing process. The mandrel 102 may comprise any electrically conducting material that can be used in an electrolytic process without any dimensional change in the electrolytic solution. The mandrel may comprise a metal, an electrically conducting ceramic or an electrically conducting polymer. Suitable metals are copper, steel, brass, bronze, silver, aluminum, or the like, or a combination thereof. Suitable electrically conducting ceramics include indium tin oxide, antimony oxide, fluorine doped tin oxide (FTO), fluorine doped zinc oxide $RuO_2$, $IrO_2$, $SrRuO_3$, $La_{0.5}Sr_{0.5}CoO_3$, or a combination thereof. Intrinsically conductive polymers such as polyaniline, polypyrrole, polythiophene, polyacetylene, or the like, or a combination thereof, can also be used in the mandrel. Insulating polymers and insulating ceramics that are rendered electrically conducting by the addition of electrically conducting fillers such as carbon nanotubes, carbon black, metal particles, metal nanorods, or the like, or a combination thereof may also be used to form the mandrel.

The mandrel 100 having the optional textured surface 102 is then immersed in an electrolytic solution and subjected to electroplating to form a metal shim 106. The metal shim 106 is also referred to as a metal shell. The electroplating solution 105 contains a metal electrode 103 which deposits on the textured surface 102 of the mandrel 100 to form the shim. The shim is also commonly referred to as an electroform.

Suitable metals for forming the shim are nickel, copper, iron, aluminum, zinc, gold, platinum, titanium zirconium, cobalt, or the like, or a combination thereof. In an embodiment, the shim formed from one or more of the aforementioned metals has a nominal thickness of 0.015 inches to 0.500 inches, preferably 0.02 inches to 0.330 inches. In a preferred embodiment, the shim comprises nickel and has a thickness of 0.015 inches to 0.200 inches. The electroplating process may take from 1 to 30 days, preferably 1 to 10 days.

This shim is grown with a flat "salvage" area 107 around the perimeter of the actual cavity that includes optical "fiducial" targets that provide reference to the location of the cavity for use in downstream processes. This salvage area is essentially material located at the outermost border of the flange (e.g., the flat portion of the mandrel that will eventually form a mold split-line). It is utilized for the purpose of locating, clamping, machining and protecting the useful surfaces on the shell.

The shim with a complimentary surface to that of the mandrel is then separated from the mandrel. In other words the shim 106 has a surface that is a negative image of the optional textured surface 102. The shim is now in a semi-rigid form due to the relatively small shim thickness grown. The shim cannot be used in this form to reproduce the textured surface because it lacks the strength to withstand downstream manufacturing process.

In order to render the shim strong enough to be used in a number of manufacturing processes, it is desirable to reinforce the shim with a second material. In order to reinforce the shim, it is first affixed working-side down (by a fixture such as a clamp), to a flat reference surface by means of vacuum, fastener, adhesive, or mechanical clamp. This will pull any stress-related warp or bow out of the part prior to analysis and printing.

The fixture and the non-working surface of the shim are then scanned with a non-contact 3D laser or with an optical scanning device to develop a digital model of the organic surfaces that have formed on the non-working surface of the shim. In this case, the term "organic" is used to describe a surface that is unique in its geometry (e.g., such as a snowflake). Each one of these organic surfaces will be different, and they have almost no reliable geometries that may be measured by simple means or easily defined.

It is to be noted that the non-working surface is opposedly disposed to the working surface (the surface that may contain the texture). The working surface is the surface of the shim that contacts the mandrel. This data from the scan is then used to reverse-engineer the surface geometry of the shim. During this step, the fiducial targets which are visualized using an optical measurement device, are measured with respect to the centerline of the fixture so that the true position of the shim is known relative to the fixture. In other words, one or more points on the fiducial targets may be used as reference points to determine a true position of the shin relative to the fixture.

In another embodiment, by noting certain points on the mandrel, the true position of the shim can be determine relative to the fixture by measuring certain points on the shim relative to the points on the mandrel. In this method, there may be no need for using an optical device.

In an embodiment, the laser-scanning of the shim is conducted to reverse engineer a geometry of a non-working surface, where reverse engineering a geometry of the non-working surface includes developing a profile of the non-working surface and the thickness of the shim.

The geometry, having been reverse engineered, is analyzed for areas that may be problematic to additive manufacturing techniques. Utilizing this data, a computer programmer will utilize 3D CAD/CAM (computer aided design/computer aided manufacturing) software to blend the existing shim geometry with the desired final geometry for the insert and output a CNC program, or multiple programs to yield the final geometry.

The fiducial targets on the working side of the surface are used as reference locations, and the shim/fixture assembly is placed into an additive/subtractive manufacturing machine tool and skewed relative to the machine's coordinate systems. Alternatively, the machine's coordinate system may be skewed to match the location of the part. If needed, machining operations are utilized to remove unwanted material stock from the shim. In short, this measurement facilitates the minimization of any defects in the shim during the electroplating process.

The same machine tool, featuring an additive manufacturing head 108, then 3D prints additional material or any other suitable alloy (as shown by reference numeral 110) onto the shim until a known, controlled geometry with substantial thickness (up to 0.5 inches) is achieved. This additional material 110 added via the additive manufacturing process is referred to as a support. The support provides a uniform thickness to the shim. This increased thickness provides strength and uniform dimensions to the shim, which enables consistent reproduction of the features throughout the manufacturing process. During the additive manufacturing process other supporting structures such as cooling lines, vacuum channels, and other subsurface tooling features (not shown) may be printed into the support 110. The shim 106 with the support 110 may then be separated from the mandrel 100 to produce a tooling insert 112 that can be used to mass produce replicas of the original textured surface 102. In an embodiment, the mandrel 100 may be supported from the tooling insert 112 prior to performing scanning the shim with a non-contact 3D laser or with an optical scanning device to develop a digital model of the organic surfaces.

Optionally, posts of any desired length may be 3D printed to protrude from the back surface of the shim insert. These may later be machined using a tap-die or thread cutting technique to form positive fasteners. This may be utilized to further-decrease the required thickness of the electroformed shim. The shim is referred to herein as an electroform.

The back side of the insert is finish machined, or ground to final geometry for insertion into the tool base (i.e., such as an injection molding machine).

In summary, the method disclosed herein comprises growing a shim by disposing a mandrel having an optional textured surface in an electrolytic bath. The shim contains a negative image of the optional textured surface (of the mandrel) formed by electrolytic deposition of a metal. The shim is then affixed working-side down on a reference plane via a fixture and the non-working surface is optically scanned the shim to reverse engineer a geometry of a non-working surface. The optical scanning may include laser scanning. In an embodiment, the optical scanning is performed with a non-contact 3D laser or an optical scanning device to develop a digital model of the shim.

The scanning further comprises measuring fiducial targets on the shim with respect to a centerline of the fixture so that the true position of the shim is known relative to the fixture.

Reverse engineering a geometry of the non-working surface includes developing a profile of the non-working surface and the thickness of the shim. Additive manufacturing is then conducted to add material to the non-working surface of the shim to facilitate defect correction in the shim. In an embodiment, 3D printing (additive manufacturing is conducted) of a metal is conducted on the non-working surface of the electroform to increase its overall thickness for use in process tooling applications. The shim with the material added via an additive manufacturing process is called an insert. The material (added via additive manufacturing) may be a metal nickel, copper, brass, iron, cobalt, aluminum, or alloys thereof. Alloys such as steel, carbon steel, stainless steel, or the like may also be used. Other materials such as ceramics and polymers may also be used to increase overall thickness or correct for other defects in the shim.

The method further involves machining the non-working surface of the insert to resolve any problems with additive manufacturing. The machining may include drilling, planing, milling, lapping, grinding, shaving, or the like, or a combination thereof. The insert may then be used in other manufacturing machines (e.g., injection molding machines, compression molding machines, blow molding machines, and the like, to mass-produce replica's of the original mandrel.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising:
   growing a shim by disposing a mandrel having a textured surface in an electrolytic bath, where the shim contains a negative image of the textured surface formed by electrolytic deposition of a metal;
   affixing the shim working-side down on a reference plane using a fixture after growing the shim, to reduce stress-related warp or bow out of the shim prior to optically scanning the shim;
   optically scanning the shim to reverse engineer a geometry of a non-working surface, where reverse engineering a geometry of the non-working surface includes developing a profile of the non-working surface and the thickness of the shim; and
   adding a material to the non-working surface of the shim via additive manufacturing to form a tool insert.

2. The method of claim 1, further comprising machining the non-working surface.

3. The method of claim 1, where defect correction includes increasing the shim thickness.

4. The method of claim 1, where the optical scanning includes laser scanning.

5. The method of claim 1, where the optical scanning is performed with a non-contact 3D laser or an optical scanning device to develop a digital model of the shim.

6. The method of claim 1, further comprising measuring fiducial targets with respect to the centerline of the fixture so that the true position of the shim is known relative to the fixture.

7. The method of claim 6, further comprising using fiducial targets on the working surface as a reference location and skewing the shim relative to an additive manufacturing machine's coordinate systems.

8. The method of claim 6, further comprising using fiducial targets on the working surface as a reference location and skewing an additive manufacturing machine's coordinate system relative to the fiducial target on the shim.

9. The method of claim 1, further comprising using the tool insert to manufacture replicas of the mandrel.

* * * * *